(12) United States Patent
Herfst et al.

(10) Patent No.: US 11,709,181 B2
(45) Date of Patent: Jul. 25, 2023

(54) PROBE CASSETTE FOR HOLDING A PROBE IN STORAGE FOR USE IN A SCANNING PROBE MICROSCOPE

(71) Applicant: Nederlandse Organisatie voor toegepast-natuurwetenschappelijk onderzoek TNO, 's-Gravenhage (NL)

(72) Inventors: Roelof Willem Herfst, Capelle a/d Ijssel (NL); Lukas Kramer, Berkel en Rodenrijs (NL); Anton Adriaan Bijnagte, Tricht (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/770,801

(22) PCT Filed: Nov. 6, 2020

(86) PCT No.: PCT/NL2020/050696
§ 371 (c)(1),
(2) Date: Apr. 21, 2022

(87) PCT Pub. No.: WO2021/091383
PCT Pub. Date: May 14, 2021

(65) Prior Publication Data
US 2022/0390486 A1    Dec. 8, 2022

(30) Foreign Application Priority Data
Nov. 7, 2019 (EP) .................................. 19207663

(51) Int. Cl.
*G01Q 70/02* (2010.01)

(52) U.S. Cl.
CPC .................................. *G01Q 70/02* (2013.01)

(58) Field of Classification Search
CPC ...................................................... G01Q 70/02
See application file for complete search history.

(56) References Cited

U.S. PATENT DOCUMENTS

| 5,705,814 A | 1/1998 | Young et al. |
| 8,925,111 B1 | 12/2014 | Park et al. |

(Continued)

OTHER PUBLICATIONS

European Patent Office, International Search Report in corresponding International Application No. PCT/NL2020/050696, dated Jan. 19, 2021 (3 pages).

*Primary Examiner* — Eliza W Osenbaugh-Stewart
(74) *Attorney, Agent, or Firm* — Leydig, Voit & Mayer, Ltd.

(57) ABSTRACT

The present disclosure concerns probe cassette 1 for holding a probe 60 in storage to provide automated transfer of the probe to a probe mount of a scanning probe microscope. The probe cassette comprising a first vacuum chamber C1 with a volume V1, and a second vacuum chamber C2 with a volume V2, and a first and second vacuum channel 10, respectively fluidly connecting the first and second vacuum chamber to an outlet 30 fluidly connectable to an external vacuum, such that upon application of the external vacuum a mounting position of the probe relative to the cassette and a mounting position of the cassette relative to the sample stage is maintained. The probe cassette arranged to allow breaking a vacuum condition in the second chamber maintaining the mounting position of the probe before breaking a vacuum condition in the first chamber maintaining a mounting position of the probe cassette.

15 Claims, 6 Drawing Sheets

(56) References Cited

U.S. PATENT DOCUMENTS

2008/0006083 A1  1/2008  Feinstein et al.
2017/0160341 A1  6/2017  Hong et al.

PROBE CASSETTE FOR HOLDING A PROBE IN STORAGE FOR USE IN A SCANNING PROBE MICROSCOPE

CROSS-REFERENCE TO RELATED APPLICATIONS

This patent application is a U.S. National Phase of PCT International Application No. PCT/NL2020/050696, filed Nov. 6, 2020, which claims priority to European Application No. 19207663.6, filed Nov. 7, 2019, which are both expressly incorporated by reference in their entireties, including any references contained therein.

TECHNICAL FIELD AND BACKGROUND

The present disclosure relates to a probe cassette for holding a probe in storage for use in a scanning probe microscope, the scanning probe microscope including a selectively activatable pick-up means arranged to provide automated transfer of the probe in the probe cassette when mounted on a sample stage of the scanning probe microscope to a probe mount of the scanning probe microscope. The present disclosure further disclosure relates to a system of such a scanning probe microscope and probe cassette, and to a method for automated transfer of a probe.

Scanning probe microscopy (SPM) includes atomic force microscopy (AFM) and its variations relate to measurement methods that allow for the probing of a wide range of surface properties including surface topography, and various physical and mechanical properties. These include, but are not limited to, local stiffness, elasticity, friction, magnetic, electric and other properties. Typically, in scanning probe microscopy a probe, such as flexible cantilever including a sharp tip is brought into proximity to the surface of a sample to be probed.

During probing of a sample such probes may degrade reducing or even disabling an ability to obtain high quality measurements of a sample. For example, the cantilever and/or tip may become damaged, contaminated or dull. In order to such case the probe must be replaced to regain the ability to make high quality measurements. These probes are typically provided separately as consumables. Typically probe replacement is been done in a manually operated procedure by a trained operator who removes the old probe and installs a new probe in an operation requiring significant skill, e.g. to avoid damaging the probe, e.g. a delicate cantilever and/or the scanning probe microscope. Further, the replacement procedure typically requires precise manual adjustment of an operator to ensure proper alignment between the probe and a detection system of the scanning probe microscope. During these operations the SPM instrument is usually unavailable for use. Accordingly, there exists a need for automated probe replacement. U.S. Pat. No. 5,705,814 describes a scanning probe microscope having automatic probe exchange and alignment. A disadvantage of the described method is that it lacks control over the probe chip in particular during and prior to probe transfer. As a result a probe alignment may be inaccurate and/or unreliable.

SUMMARY

It is an object of the present disclosure to improve upon known methods and means for automated probe exchange. In particular it is an object to provide a method and probe storage means for use with a scanning probe microscope including a selectively activatable pick-up means arranged to provide automated transfer of the probe in the probe cassette to a probe mount of the scanning probe microscope with improved accuracy and/or reliability.

To this end, in accordance with a first aspect there is provided a probe cassette for holding a probe in storage. The cassette adapted for use in a scanning probe microscope including a selectively activatable pick-up means arranged to provide automated transfer of the probe in the probe cassette when mounted on a sample stage of the scanning probe microscope to a probe mount of the scanning probe microscope. The probe cassette comprising: a mounting surface arranged to define a first vacuum chamber with a volume V1 for holding the probe cassette onto the sample stage, and at least a first probe pocket comprising a pocket surface arranged to define a second vacuum chamber with a volume V2 for holding the probe in storage, the probe pocket being preferably positioned opposite the mounting surface. The probe cassette further comprising a first vacuum channel with flow resistance R1 and second vacuum channel with a flow resistance R2. The first and second vacuum channels respectively fluidly connecting the first and second vacuum chamber to an outlet fluidly connectable to an external vacuum, such that upon application of the external vacuum a mounting position of the probe relative to the cassette and a mounting position of the cassette relative to the sample stage may be maintained. The probe cassette is arranged to allow breaking a vacuum condition in the second chamber maintaining the mounting position of the probe before breaking of a vacuum condition in the first chamber maintaining a mounting position of the probe cassette such that the probe may be transferred from storage to the probe mount, e.g. upon activation of the selectively activatable pick-up means.

Breaking of a vacuum condition in the second chamber maintaining the mounting position of the probe before breaking of a vacuum condition in the first chamber may advantageously allow transfer of the probe from the cassette to the probe mount without releasing the mounting position of the cassette, e.g. maintaining a position of the cassette relative to the microscope including sensitive parts such as the mounting position or a probe scanner, e.g. a piezo system scan head system. Transferring the probe to the probe mount while maintaining a position of the cassette, may improve accuracy of the transfer and/or improve alignment of the transferred probe to a probe mount, e.g. a probe mount of the scanner. It will be appreciated that improved transfer accuracy of the probe and/or improved alignment of the transferred probe in the probe mount may improve an alignment of the transferred probe with a detection system of the scanning probe microscope.

Advantageously, the probe cassette may be reversibly mounted onto the sample stage of the scanning probe microscope to form a co-moving probe storage means. Having the probe cassette mounted on the sample stage of the scanning probe microscope allows using existing translation means already provided with the SPM, e.g. a translation means acting on the sample stage and/or translation means acting on the probe mount, to align the stored probe to the probe mount and/or a detection means for detecting a position of the probe during scanning of a sample. Translation means may be understood to include course translation means, e.g. XY or Z steppers and/or rotational translators, and fine translation means such as piezo scanners.

Having the probe storage cassette to be reversibly mountable allows removing the cassette from the SPM after probe exchange. Removing the probe cassette from the sample stage releases precious space on the stage for samples and reduces inertia of the stage, e.g. compared to a stage with a permanent co-moving probe storage means. Reducing inertia of the stage may improve speed and/or accuracy of the measurement. Further, removing the probe storage allows for externally storing the cassette and possible remaining probes stored therein with reduced likelihood contamination.

Maintaining a position of the cassette may mitigate undesired movement of the cassette prior, during and/or after transfer of a probe, and/or may reduce a likelihood of inflicting movement related wear and/or damage to the cassette, e.g. its mounting surface, and/or to the SPM device, e.g. the probe mount.

In one embodiment, the cassette is provided with vacuum release means to allow breaking of a vacuum condition in the second chamber maintaining the mounting position of the probe before breaking of a vacuum condition in the first chamber. A vacuum condition maintaining a mounting position may be interpreted as a vacuum, i.e. pressure, at a level wherein the overall position of an item may be maintained, e.g. probe held to the cassette by a relative under-pressure. Breaking of a vacuum condition may be interpreted as a reduction of a vacuum level, i.e. an increase in pressure, e.g. by introduction of an inflow of a gas, e.g. air, at a comparatively higher pressure. Breaking of a vacuum condition maintaining a mounting position may include a complete reduction the vacuum, e.g. up to atmospheric pressure, e.g. introducing ambient air into the vacuum chamber by opening a fluid connection to the camber. It will be appreciated that the vacuum in the chamber, e.g. the chamber holding the probe, holding the need not be completely broken.

Said vacuum release means include but are not limited to: means affecting a vacuum condition in the first vacuum chamber, said means provided to the first vacuum channel and arranged to close or at least reduce the fluid connection between the first chamber and the outlet such that upon increasing the pressure at the outlet, e.g. by breaking the external vacuum, the vacuum condition in first chamber may be maintained, at least for a period sufficient to release the prove from the pocket and allow transfer of the probe to the scanner. For example, such means may include a selectively activatable two-way valve positioned along the first channel. Alternatively of in addition, the vacuum release means may include a selectively activatable three-way valve, for example, positioned and arranged to control the direction and/or cross-section of a fluid connection between outlet and first or second vacuum chamber.

Alternatively or in addition, said means may include provision of a selectively activatable leak channel which is fluidly connected to the second vacuum chamber to reduce a vacuum level in the second chamber, e.g. a leak channel dimensioned such that a vacuum may persist in the first chamber. Alternatively or in addition, the vacuum level in the second chamber may be controlled by a selectively activatable leak valve and/or leak channel including such a valve.

It will be appreciated that pocket surface is preferably held at a similar, e.g. nominally the same, same angle as a reception surface on the probe mount. This may allow more reliable probe transfer from the cassette to the probe mount The probe pocket is preferably dimensioned such that its lateral dimensions are only slightly larger than an exterior dimension of the probes. In this way stored probes may be closely aligned according to a preset orientation relative to the storage medium. Accordingly, this may simplify the alignment process of the therein stored probe relative to the probe mount.

In a preferred embodiment the first and second vacuum channels and chambers are dimensioned such that a characteristic vacuum release time constant of the first vacuum chamber T1 is larger than a characteristic vacuum release time constant of the second vacuum chamber T2 and a characteristic transfer time T3 of the selectively activatable pick up means such that upon a reduction of the external vacuum the probe may be released from the cassette and transferred to the probe mount before releasing the mounting position of the cassette. The use of channels and/or chambers with properly dimensioned time constants enables to achieve the transfer as desired without providing additional flow control elements such as valves and break/leak seals and/or other moving parts to the cassette. Accordingly, such cassette may regarded as a passive solution. Accordingly, important benefits may arise from the use of a passive probe storage cassette. These benefits include but are not limited to reduced cost, reduced complexity, improved reliability, and reduced wear of the probe cassette.

The characteristic vacuum release time constant of a vacuum chamber may be understood to be the characteristic time required for said chamber to reach a new vacuum level, i.e. pressure level, in response to a reduction of the external vacuum level, e.g. a sudden increase in the external pressure resulting in an in-flow of a gas.

Advantageously, breaking of a vacuum condition in the second chamber maintaining the mounting position of the probe before breaking of a vacuum condition in the first chamber may be attained by providing a probe cassette wherein the value of the characteristic vacuum release time constant of the first chamber T1 is larger than the corresponding value for the second chamber T2 by a factor of at least two, preferably at least four, more preferably at least eight, more preferably even larger, e.g. in a range between ten and one hundred. With larger factors allowing for a comparatively slower reduction of the vacuum level in the first chamber, thusly allowing more time to transfer of the probe chip to the scanner before the mounting position of the cassette may become affected.

It will be appreciated that the characteristic vacuum release time constant may be determined by flow-dynamics of the systems as a whole and includes volume and flow resistances of the chamber and channel. In practice the characteristic vacuum release time constant of a chamber may be defined by a measured time to reach a given fraction, e.g. 90%, of a new equilibrium pressure upon a sudden reduction in an external vacuum level release of the vacuum, e.g. by an exposure to ambient pressure at the end of the channel connected to the chamber.

Inventors found that in the particular application of a probe cassette comprising a vacuum chamber with vacuum channels connected thereto the characteristic vacuum release time may be governed by a product of the volume of the chamber and the flow resistance of gas flowing through the vacuum channel to fill the chamber. Accordingly, the characteristic vacuum release time constant of the first (T1) and second vacuum chamber (T2) may be suitably selected by appropriate dimensioning of the channel and/or chamber, in particular length and/or cross-section of the channel.

According to further aspect the present disclosure relates to a system of a probe cassette, preferably any one or more of the probe cassettes according to the first aspect, and a scanning probe microscope including a selectively activatable pick-up means arranged to provide automated transfer of the probe in the probe cassette when mounted on a sample stage of the scanning probe microscope to a probe mount of the scanning probe microscope.

According to yet a further aspect the present disclosure relates to a method for automated transfer of a probe in a probe cassette to a probe mount of a scanning probe microscope. The scanning probe microscope including a selectively activatable pick-up means. The method comprising providing a probe cassette including a pocket bearing a probe. The probe cassette being a probe cassette in accordance with the first aspect of the present disclosure. The method further comprising applying an external vacuum to the outlet of the probe cassette such that a mounting position of the probe relative to the cassette and a mounting position of the cassette relative to the sample stage is maintained. The method further comprising: providing relative movement between sample stage and probe mount to align the probe relative to the probe mount; activating the selectively activatable pick-up means; releasing a vacuum to the outlet after aligning a position of the probe relative to the probe mount to reduce a vacuum level maintaining the mounting position of the probe relative to the cassette to allow transfer of the probe from the pocket to the probe mount; and re-applying the vacuum to the outlet before the vacuum level maintaining a mounting position of the cassette relative to the sample stage is reduced to a level at which the mounting position may no longer be maintained, i.e. a level at which the cassette may lose its mounting position relative to the sample stage, e.g. as a result of an acceleration of the sample stage.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

As described herein a probe mount may be interpreted as a mounting means, e.g. a holder for holding a probe. Typically the probe mount may be connected to a scanner of the scanning probe microscope. Alternatively or in addition, the scanning probe microscope may be provided with a scanner acting on the sample stage. In a preferred embodiment the scanning probe microscope may be an atomic force microscope. Accordingly, the probe may be formed by a probe chip including a flexible cantilever, e.g. cantilever probe chips as widely commercially available. During operation relative translation is provide between a sample to be measured and the probe, i.e. the probe in the mount. Accordingly, the mount may be provided at the end of a scanner. Alternatively or in addition the sample may be provided on a sample stage with a scanner.

As specified herein the scanning probe microscope is provided with a selectively activatable pick-up means arranged to provide automated transfer of the probe in the probe cassette when mounted on a sample stage of the scanning probe microscope to the probe mount of the scanning probe microscope. The selectively activatable pick-up means may be understood to include one or more of a vacuum clamp; a spring clamp; a magnetic clamp; and an electrostatic clamp. By activation of the vacuum clamp a probe positioned below the mount, e.g. in a probe cassette, may be attached to said mount. The magnetic clamp, preferably an electromagnetic clamp, may be activated to attach a magnetic probe positioned below the mount to said mount.

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1A:
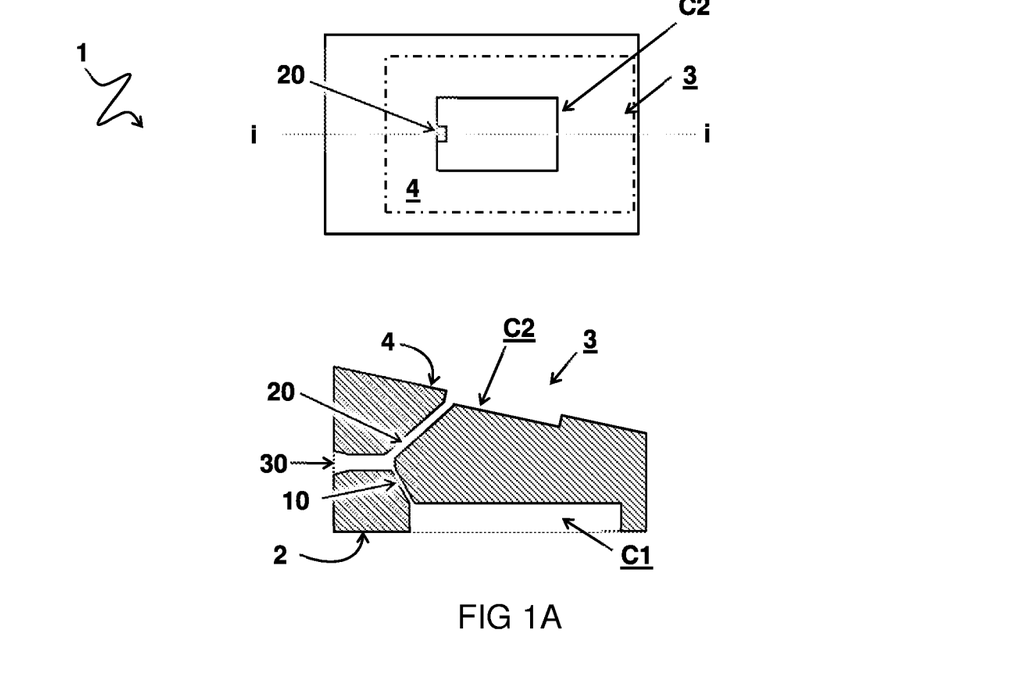
FIG. 1A provides schematic top- and cross-sectional side views of an embodiment of the probe cassette.
Figure 1B:
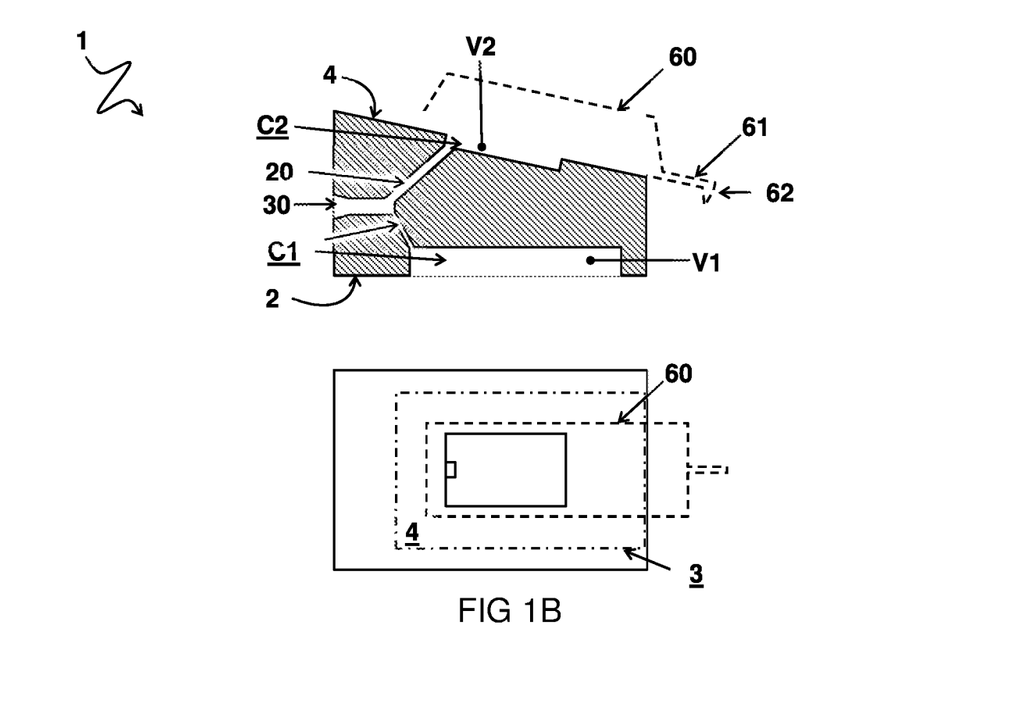
FIG. 1B provides schematic top- and cross-sectional side views of an embodiment of the probe cassette wherein a position of a stored probe is indicated.

FIG. 1A (top) provides a schematic top view of an embodiment of the probe cassette 1. Visible in the top view a first probe pocket 3. The probe pocket 3 is schematically marked by a dash-dotted line and coincides with a pocket surface 4 for storing a probe. At a central position of the pocket surface 4 there is defined a second vacuum chamber C2 for holding a probe in storage (see probe 60 depicted in FIG. 1B). Opening in second vacuum chamber C2 is an end portion of the second vacuum channel 20. For other parts and components of this embodiment of the probe cassette 1 reference is made the image depicted directly below the top view image representing a schematic cross-sectional side view along central cutting line i-i. Please note that further side-view images also illustrate a schematic cross-sectional side view along a central cutting line unless specified otherwise. In the schematic cross-sectional side view (FIG. 1A, bottom) are indicated the first probe pocket 3, the pocket surface 4 and second vacuum channel 20. Further indicated are a first vacuum chamber C1 for mounting the probe cassette 1 to a sample stage of a scanning probe microscope. Please note that for clarity reasons the stage is only depicted in relation to embodiments shown in FIGS. 3 and 4. Opening into the first vacuum chamber C1 is first vacuum channel 10. The first and second vacuum channels fluidly connect the respective chambers to an outlet 30 which may be connected to an external vacuum source (not depicted). Dotted lines indicate an outward bounding face of the respective vacuum chambers. In use, the first and second vacuum chamber C1, C2 may be bound by the sample stage 102 of the scanning probe microscope 100 and a contact surface of the probe 60 respectively, e.g. as shown in FIG. 1B.

The probe cassette may be suitably formed using materials and manufacturing methods known in the art. The chambers and channels may be provided in a separate manufacturing step, e.g. provided to a pre-formed storage body. Alternatively or in addition, the channels and/or chambers may be at least partly provided during forming of the body. Suitable methods include but are not limited to moulding, e.g. injection moulding, machining, e.g. drilling, milling, and any other suitable patterning means. It will be appreciated that the present disclosure is not to be construed as limited to the shape and/or number of channels and/or chambers depicted herein. For example, also envisioned are embodiments comprising differently shaped chambers, e.g. rounded shapes, and embodiments comprising of a plurality of first and/or second chambers, for example interconnected chambers or separated chambers each individually connected to the outlet via separate channels. Preferred dimensioning aspects of the chambers and/or channels will be elaborated on in more detail below.

As described, the present disclosure relates to a probe storage means which is arranged to upon application of the external vacuum allow maintaining a mounting position of the probe relative to the cassette and a mounting position of the cassette relative to the sample stage. By applying a vacuum to the outlet the stored probe may be firmly held in a pre-determined position relative to the sample stage, at least so long as the vacuum conditions in the respective chambers for holding the mounting position of the probe and cassette are maintained. In comparison, conventional storage means wherein probes are lying loosely (e.g. under influence of gravity) cannot prevent undesired movement of stored probes, e.g. directly prior to and during probe transfer.

Further, provision of a probe pocket having a vacuum chamber C2 may allow transfer of a probe, e.g. a worn or used probe, from the probe mount of a scanning probe microscope 100 to an empty pocket of the probe cassette 1. Activation of a vacuum to the vacuum chamber may induce an under pressure, e.g. a local under pressure, which may contribute to releasing the probe from the mount and/or to directing the released probe to the empty pocket. Such a probe release routine may comprise the steps of: providing a probe cassette 1 as described herein having at least one empty probe pocket; aligning the probe mount 103 bearing the probe to be released relative to the empty pocket; deactivating the selectively activatable pick-up means holding the probe to be released; applying an external vacuum to the outlet of the probe cassette such that a mounting position of the released probe relative to the cassette and a mounting position of the cassette relative to the sample stage is maintained.

FIG. 1B provides schematic top- and cross-sectional side views of the embodiment of the probe cassette depicted in FIG. 1A but with a probe 60 covering an area of the pocket surface 4 of the first probe pocket 3. In the figure the probe 60 is an AFM probe chip including a cantilever 61 with probe tip 62 at a terminal end. For clarity reasons the probe is indicated by a dashed line. In FIG. 1B (top) it may be seen that the second vacuum chamber C2 with volume V2, in use may be bound by a surface of the probe, e.g. a contact surface of the probe chip. The pocket surface 4 preferably matches a contact surface of the probe, e.g. probe chip, such that in use a seal may be formed for holding a vacuum in the second vacuum chamber C2. Similarly, the mounting surface 2 preferably matches a contact surface of the sample stage 102 (see e.g. FIG. 3A) such that in use a seal may be formed for holding a vacuum in the first vacuum chamber C1 with volume V1. Optionally, there may be provided separate means, e.g. a washer or grease, to improve a seal between the respective surfaces.

Figure 2:
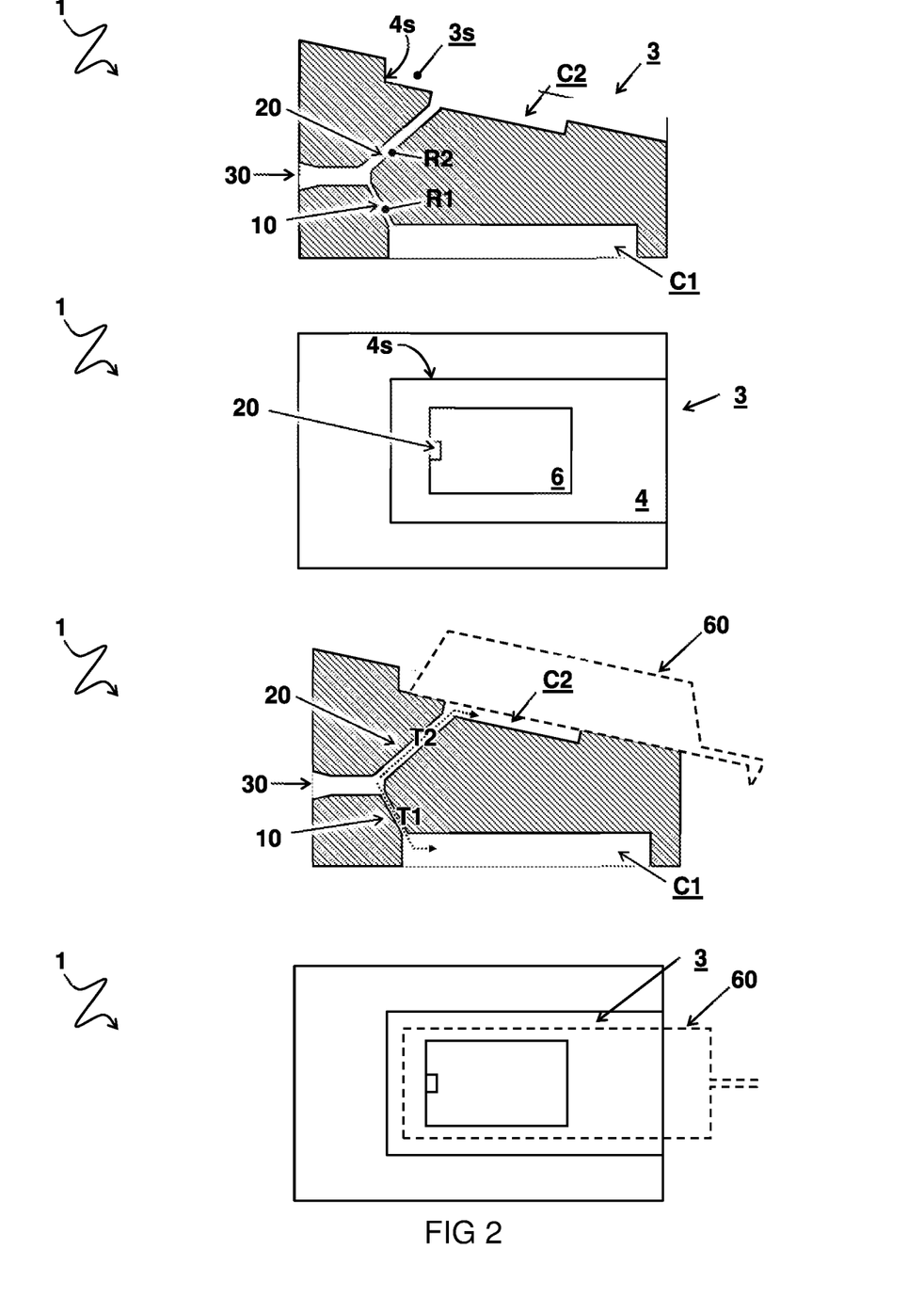
FIG. 2 provides schematic top- and cross-sectional side views of a further embodiment of the probe cassette without (top) and with an indicated position of a stored probe.

FIG. 2 provides schematic top- and cross-sectional side views of a further embodiment of the probe cassette 1 without (top two images) and with (bottom two images) an indicated position of a stored probe 60. In one embodiment the first probe pocket 3 is at least in one direction laterally bound by an upstanding side wall 4s. Preferably, the first probe pocket 3 is laterally bound in a plurality of directions by one or more side walls, for example by three side walls as shown. Provision of a sidewall may reduce lateral motion of a probe in the first probe pocket 3 in conditions when no or insufficient vacuum is applied, e.g. during transport.

In a preferred embodiment the first 10 and second vacuum channels 20 and chambers C1, C2 are dimensioned such that a characteristic vacuum release time constant of the first vacuum chamber T1 is larger than a characteristic vacuum release time constant of the second vacuum chamber T2 of the selectively activatable pick up means. By suitably dimensioning first 10 and second vacuum channels 20 the probe C2 may be released from the cassette and transferred to the probe mount before releasing the mounting position of the cassette upon a reduction of the external vacuum. It will be appreciated that the characteristic vacuum release time constant of the first vacuum chamber T1 and the a characteristic vacuum release time constant of the second vacuum chamber T2 are preferably larger that the characteristic transfer time T3 of the selectively activatable pick-up means of the scanning probe microscope to allow completing of a probe transfer to the probe mount before releasing the mounting position of the cassette.

The characteristic vacuum release time constant of a vacuum chamber may be understood to be the characteristic time required for said chamber to reach a new vacuum level in response to a sudden reduction of the external vacuum level, i.e. a sudden increase in the external pressure resulting in an in-flow of a gas as shown in the bottom side view representation in FIG. 2 using dotted arrows to schematically indicate an incoming gas flow from the outlet to the respective vacuum chambers.

Advantageously, breaking of a vacuum condition in the second chamber maintaining the mounting position of the probe before breaking of a vacuum condition in the first chamber may be attained by providing a probe cassette wherein the value of the characteristic vacuum release time constant of the first chamber T1 is larger than the corresponding value for the second chamber T2 by a factor of at least four, preferably at least eight, more preferably even larger, e.g. in a range ten and one hundred, with larger factors allowing for a comparatively slower reduction of the vacuum level in the first chamber, thusly allowing more time to transfer of the probe chip to the scanner before the mounting position of the cassette may become affected.

It will be appreciated that the characteristic vacuum release time constant may be determined by flow-dynamics of the systems as a whole and includes volume and flow resistances of the chamber and channel. In practice the characteristic vacuum release time constant of a chamber may be defined by a measured time to reach a given fraction, e.g. 90%, of a new equilibrium pressure upon a sudden reduction in an external vacuum level release of the vacuum, e.g. by an exposure to ambient pressure at the end of the channel connected to the chamber.

It will likewise be appreciated that upon transfer of the stored probe the second vacuum chamber C2 may no longer be sealed which may result in an inward gas flow to first vacuum chamber C1 via the first and second vacuum channels (10,20). Advantageously, a mounting position of the probe cassette 1 onto the sample stage 102 may be maintained, even in the event of a leak flow, e.g. an inward air flow after transfer of the probe, so long as the combined flow resistance between probe cassette 1 and external vacuum source, e.g. a vacuum pump, is lower than R1.

Inventors found that for a vacuum chamber with thereto connected vacuum channel the characteristic vacuum release time may be governed by a product of the volume of the chamber and the flow resistance of a gas flowing through the vacuum channel to fill the chamber. Accordingly, the characteristic vacuum release time constant of the first T1 and second vacuum chamber T2 may be set by appropriate dimensioning of the channel and/or chamber.

The range over which the volume of the respective chambers V1, V2 may be set may be limited by a dimensioning constraint of the probe pocket and mounting surface respectively. The range over which the volume of the respective chambers may be set may be further limited by a dimension of the probe cassette in a direction away from the mounting surface (e.g. thickness). It will be appreciated that a lateral dimension of the second vacuum chamber for holding the probe to the probe pocket may be limited by a lateral dimension of the probe, e.g. a probe chip 60.

The depth of the vacuum chambers may be limited by a dimension of the probe cassette, e.g. a thickness of the cassette in a direction away from the mounting surface. Typically the thickness of the probe cassette is limited to a maximum of about one centimeter to limit a required separation distance between sample stage and scanner (probe mount) during automated probe transfer. Accordingly, the depth of the vacuum chambers will be limited to a value smaller than about one centimeter, e.g. in a range between 0.5 and five millimeter, e.g. one millimeter.

Accordingly, inventors found that the attaining desired characteristic vacuum release times of the first and second chamber may be suitable achieved by provision of vacuum channels with a pre-defined length and/or cross section. Advantageously, breaking of a vacuum condition in the second chamber maintaining the mounting position of the probe before breaking of a vacuum condition in the first chamber may be attained by suitably dimensioning the first and second vacuum channels such that the ratio of a cross section area of the first vacuum channel to that of the second channel is preferably at least about two, preferably at least four or more, e.g. in a range between five and twenty.

Figure 3A:
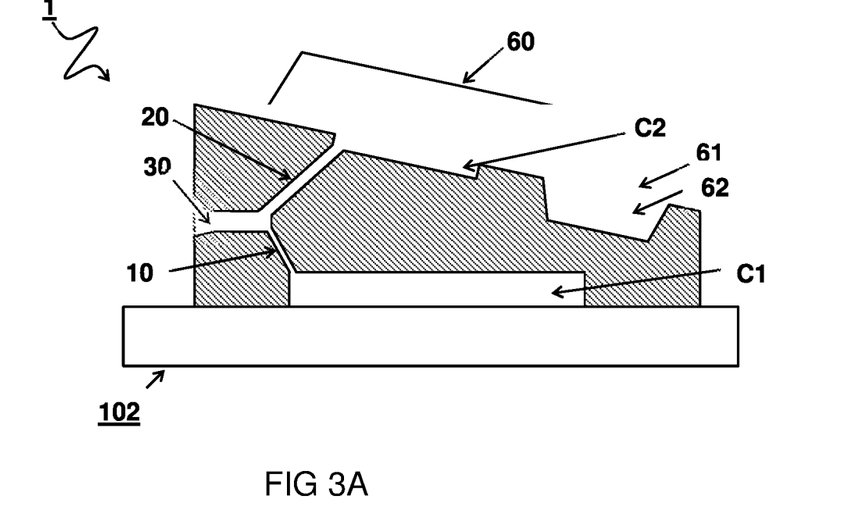
FIG. 3A provides a schematic cross-section side view of yet a further embodiment of the probe cassette, wherein an external vacuum pump and connection thereto are indicated, the cassette bearing a stored probe and mounted to a sample stage of a scanning probe microscope.

In a preferred embodiment, e.g. as shown in FIG. 3A, the pockets may further have additional probe tip clearance and/or sidewall dimension which my allow storing a probe 60 with sharp probe tips oriented towards the sample stage 102 without damaging the probe, e.g. damage during a lateral translation of the cassette on the sample stage.

Figure 3B:
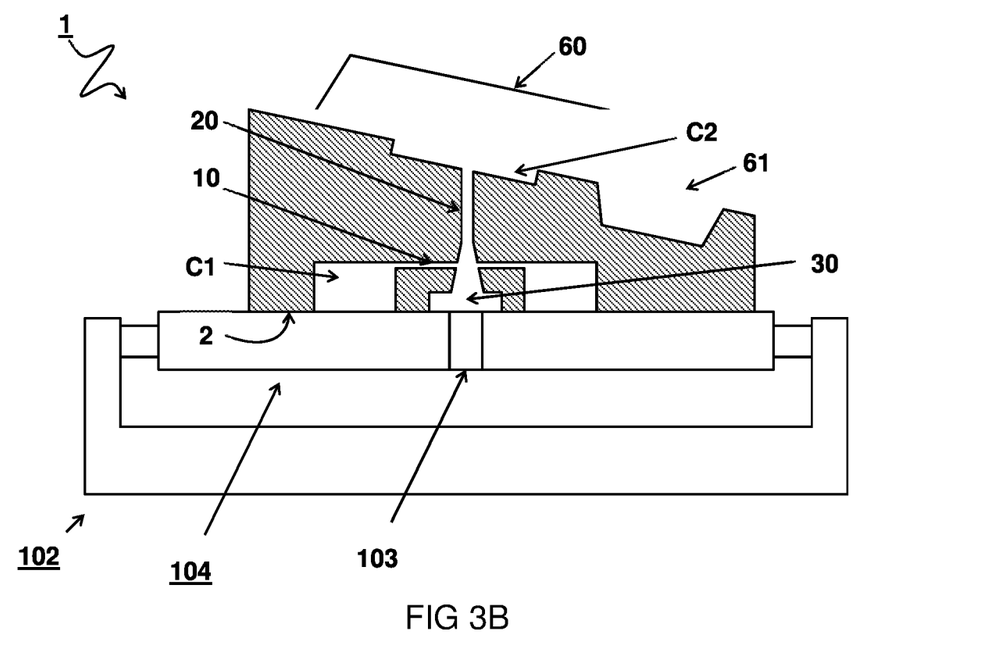
FIG. 3B provides a schematic cross-section side view of yet a further embodiment of the probe cassette, the cassette bearing a stored probe and mounted to a sample stage of a scanning probe microscope bearing a vacuum table with a vacuum groove.

FIG. 3B provides a schematic cross-section side view of yet a further embodiment of the probe cassette. In the figure the probe cassette 1 including the first and second vacuum chambers C1,C2 and corresponding vacuum channels 10,20, is depicted bearing a stored probe 60 with cantilever 61. The probe cassette 1 is mounted to a sample stage 102 of a scanning probe microscope bearing a vacuum table 104 with a vacuum groove 103.

In a preferred embodiment, e.g. as shown, the outlet 30 is included on the mounting surface and separated at a distance from the first vacuum chamber. The outlet 30 is arranged to interface with a vacuum channel 103 provided on the sample stage, e.g. a sample stage of the scanning probe microscope 100 arranged as a vacuum table for holding a sample to be scanned.

By providing the outlet on the mounting surface the cassette may advantageously share a vacuum source provided with the scanning probe microscope. In other words, the external vacuum source may advantageously be provided by an already available vacuum source, e.g. a pump. Thereby for example eliminating a need for providing a separate vacuum source and/or eliminating a need to provide a controller for independently controlling provision of a vacuum from a common source to the probe cassette and sample stage. Advantageously, the vacuum source may be provided with, e.g. be a part of, the scanning probe microscope. For example, a scanning probe microscope, comprising a vacuum table for holding a sample to be investigated.

Preferably, the characteristic vacuum release time of the extremal source, e.g. a vacuum level provided at the sample stage is lower than T1 and T2. By having the characteristic vacuum release time of the external vacuum, e.g. provided at the sample stage, to be lower than T1 and T2, may allow, from the view-point of the cassette, a vacuum release of the external source to be interpreted as an independent event; that is the vacuum level at a position before the outlet, i.e. at the sample stage, is stable in comparison to a level within the chambers. As such a release of vacuum at the sample stage may (e.g. by opening a leak valve) proceed faster, and be understood to be essentially completed before a consequent release of the vacuum in the cassette. This may be achieved by providing first and second vacuum channels with individually have comparatively higher flow resistances (R1, R2) than the flow resistance of the external source, e.g. vacuum channels in the sample stage.

Figure 4:
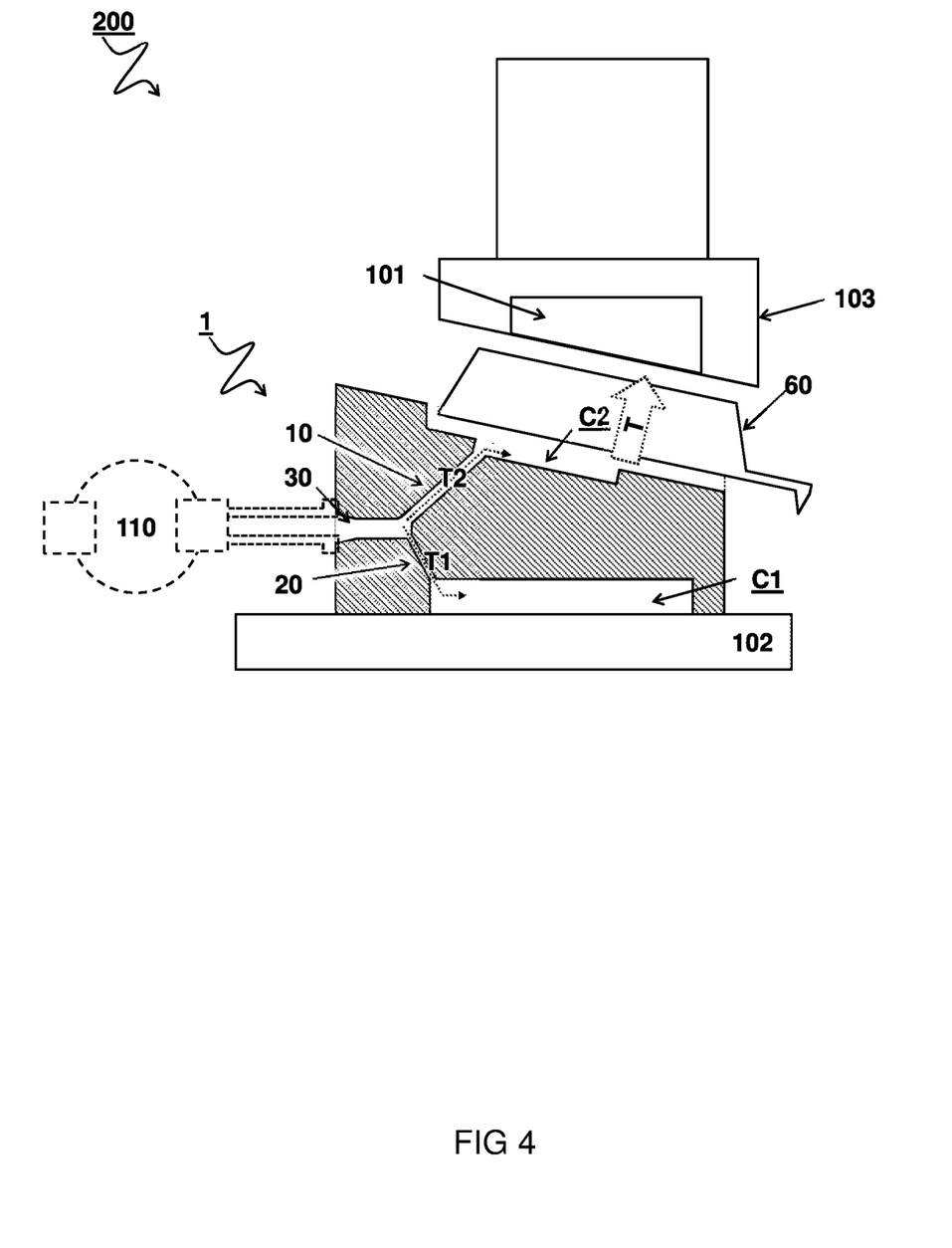
FIG. 4 provides a schematic cross-section side view of a transfer of a probe from an embodiment of the probe cassette to the probe mount of a scanning probe microscope.

FIG. 4 provides a schematic cross-section side view of a transfer of a probe from an embodiment of the probe cassette to the probe mount of a scanning probe microscope. In the figure the probe cassette 1 having a first and second vacuum chamber C1,C2, each connected to an outlet 30 by respective first and second vacuum channels (10,20) is placed on the sample stage 102 of a scanning probe microscope (not shown). A vacuum previously provided by an external vacuum source 110 connected to the second vacuum channel 20 within C1 maintains a mounting position of the probe cassette relative to the sample stage 102. A leak flow (dotted arrows) from outlet 30 enters the first and second vacuum chambers via the respective vacuum channels. After a comparatively short time corresponding to the characteristic vacuum release time constant of the second vacuum chamber T2 a vacuum condition in the second chamber is released allowing transfer T of the probe 60 to the probe mount 103 of the scanning probe microscope with an activated selectively activatable pick-up means 101.

Figure 5A:
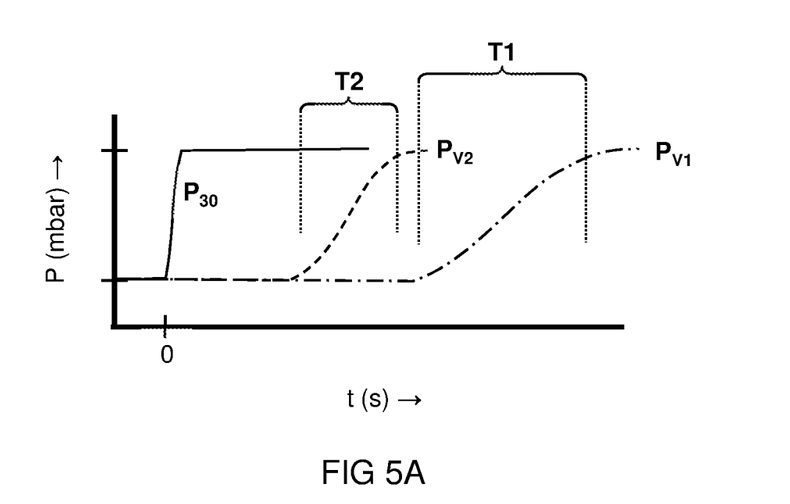
FIGS. 5A and 5B detail schematic time-pressure traces pertaining to the automated transfer of a probe in a probe cassette to a probe mount of a scanning probe microscope.
Figure 5B:
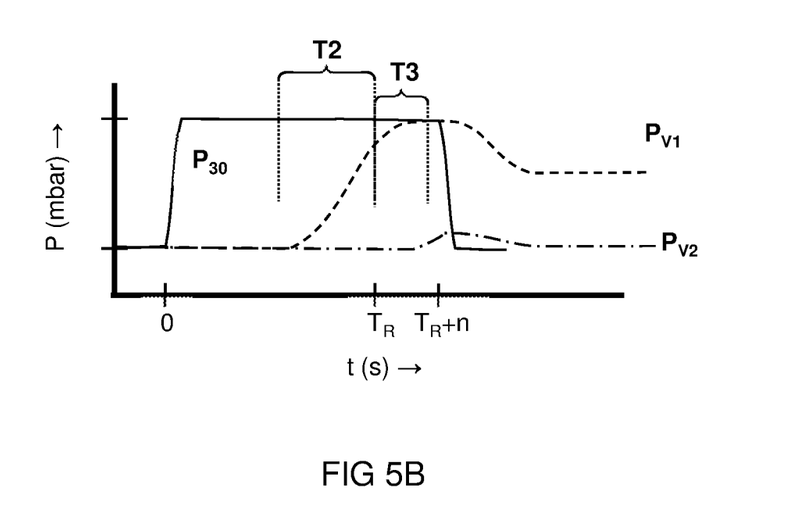

FIGS. 5A and B detail schematic time-pressure traces pertaining to the automated transfer of a probe in a probe cassette to a probe mount of a scanning probe microscope.

FIG. 5A relates to an embodiment of the probe cassette wherein the first and second vacuum channels and chambers are dimensioned such that a characteristic vacuum release time constant of the first vacuum chamber is larger than a characteristic vacuum release time constant of the second vacuum chamber and a characteristic transfer time of the selectively activatable pick up means. Displayed in the graph are time traces of the pressure at the outlet P30, and of the pressure PV1 within the first vacuum chambers and of the pressure PV2 within the second vacuum chamber resulting from introduction of a leak flow. Initially, (at t<0; i.e. before introducing a leak flow) the probe cassette 1 bearing a probe is positioned onto the sample stage of the scanning probe microscope, e.g. as schematically depicted in FIG. 4. By activating the external vacuum, e.g. a vacuum pump 110, an initial vacuum forms (comparatively low pressure) at a location of the outlet and respective chambers which maintains a mounting position of the probe relative to the probe cassette and the cassette relative to the sample stage. After a given time, e.g. initiated by an operator, a leak flow is introduced into the system (in the figure at t=0). The leak flow initially results in an increasing pressured at the inlet. From the inlet the leak flow enters the vacuum chambers via the respective vacuum channels. The leak flow then releases a vacuum condition in the second chamber before releasing a vacuum condition in the first chamber since the vacuum channels and chambers are dimensioned such that a characteristic vacuum release time constant of the first vacuum chamber T1 is larger than a characteristic vacuum release time constant of the second vacuum chamber T2. It will be appreciated that response in pressure within the system following a perturbation, e.g. an introduction of a leak flow, may follow a exponential relation of the form $e^{-t/\tau}$ with $\tau$ the characteristic response time (analogous to the RC time of a charging electrical capacitor through a series resistor) which for P30 would be very short, a bit longer for PV2 and longer still for PV1 (i.e. $\tau_{P30} < \tau_{PV2} < \tau_{PV1}$).

FIG. 5B also relates to an embodiment of the probe cassette wherein the first and second vacuum channels and chambers are dimensioned such that a characteristic vacuum release time constant of the first vacuum chamber is larger than a characteristic vacuum release time constant of the second vacuum chamber and a characteristic transfer time of the selectively activatable pick up means. Displayed in the graph are time traces of the pressure at the outlet P30, and within the first PV1 and second vacuum chambers PV2. Unlike FIG. 4 the traces do not merely depict a response of the system to an introduction of a leak flow but relate to a use operation of the device, i.e. a transfer of a probe stored in the probe cassette to a probe mount of a scanning probe microscope including a selectively activatable pick-up means. As in FIG. 5A, the probe cassette 1 bearing a probe is provided onto the sample stage of the scanning probe microscope, e.g. as schematically depicted in FIG. 4. By activating the external vacuum, e.g. a vacuum pump 110, a initial vacuum forms (comparatively low pressure) at a location of the outlet and respective chambers which maintains a mounting position of the probe relative to the probe cassette and the cassette relative to the sample stage. The use operation includes a step of providing relative movement between sample stage and probe mount to align the probe relative to the probe mount. This step is not visible in the displayed traces as provision of relative alignment between probe and probe mount typically does not affect the pressure within the system. After aligning the probe to the mount a leak flow is introduced into the system (in the figure at t=0). The leak flow initially results in an increasing pressured at the inlet until it reaches an essentially stable new level. From the inlet the leak flow enters the vacuum chambers via the respective vacuum channels. As specified herein the leak flow then releases a vacuum condition in the second chamber before releasing a vacuum condition in the first chamber since the vacuum channels and chambers are dimensioned such that a characteristic vacuum release time constant of the first vacuum chamber T1 is larger than a characteristic vacuum release time constant of the second vacuum chamber T2. After the vacuum condition in the second chamber is such that the probe position is no longer maintained (at t=TR) the probe is released from the pocket and transfers to the mount, e.g. a mount bearing an active pick-up means as shown in FIG. 4. After completing the transfer but before breaking the vacuum in the first chamber the leak flow is terminated and the external vacuum is re-applied (in the figure at t=TR+n). Please note that the situation depicted in FIG. 4 (showing the probe in a transfer motion) may correspond a pressure at a time between t=Tr and t=TR+n; e.g. in the middle of a characteristic transfer time, i.e. the period marked T3. By reapplying the vacuum, the pressure at the outlet 30, and the first and second chambers drops again. Although not visible in the top view the probe cassette 1 further comprises a first vacuum chamber C1, a first vacuum channel 10, and a outlet 30 fluidly connected to the plurality of vacuum chambers Since second vacuum chamber is no longer bound by a contact surface of the stored probe the vacuum level at the second chamber may not fully restore.

Figure 6A:
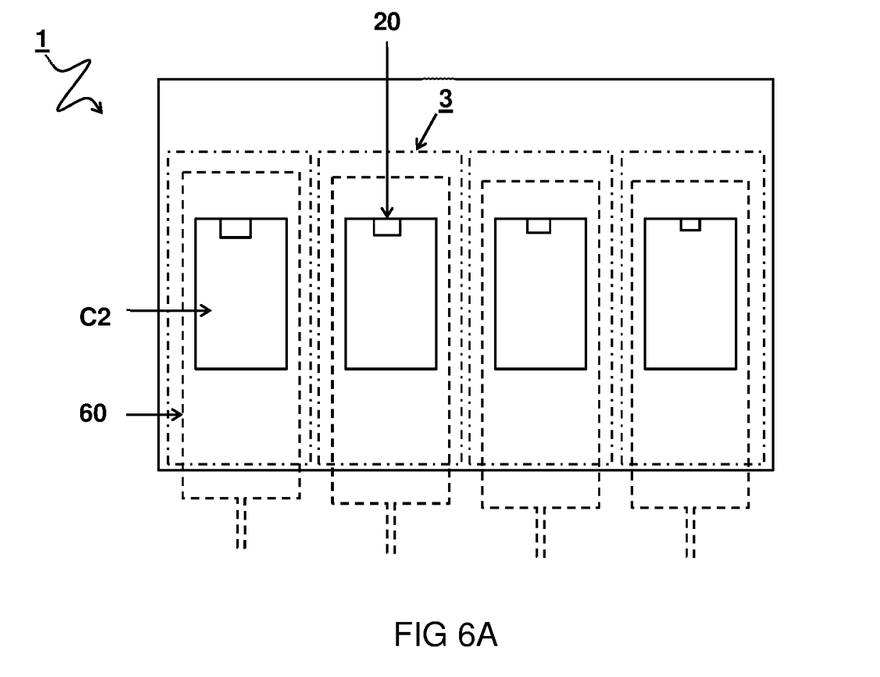
FIG. 6A provides a schematic top view of an embodiment of the probe cassette comprising a plurality of probe pockets.

FIG. 6A provides a schematic top view of an embodiment of the probe cassette 1 comprising a plurality of probe pockets 3. A position of sored probes 60 is indicated by a dash-dotted-line. In accordance with the first aspect of the disclosure, each pocket of the plurality of probe pockets is provided with a respective vacuum chamber and vacuum channel with a flow resistance to fluidly connect the respective vacuum chamber to the first vacuum chamber (via the first vacuum channel) and the outlet (not shown).

Similarly as described before the pockets may be provided with one or more upstanding side walls and or with a clearance to allow positioning of a probe chip bearing a cantilever with a probe tip towards the sample stage, e.g. a described with reference to FIGS. 2 and 3A. Likewise, the outlet 30 is preferably included on the mounting surface and separated at a distance from the first vacuum chamber, wherein the outlet is arranged to interface with a vacuum channel provided on the sample stage, e.g. as described with reference to FIG. 3B.

Upon removing a probe from the cassette the corresponding vacuum chamber is no longer bound by a contact surface of the stored probe. Therefore a leak flow may be formed which reduces a vacuum level in the first vacuum chamber C1 and remaining probe pockets, particularly as an increasing number of probes is consumed and an increasing number of probe pockets is left unsealed.

In one embodiment, the plurality of probe pockets is each individually fluidly connected, i.e. directly connected by a second vacuum channel to the outlet 30 by a corresponding vacuum channel. A direct connection between outlet and the respective pocket may allow individually releasing a specific stored probe without releasing a mounting position of the remaining probes. e.g. in an embodiment comprising an individually addressable valve in each of the second vacuum channel.

In a preferred embodiment, the plurality vacuum chambers and corresponding vacuum channels are dimensioned such that a characteristic vacuum release time constant progressively increases for each additional pocket such that probes in the respective additional pockets may be separately released. That is, dimensioned such that a first probe may be released from the cassette without releasing a mounting position of the remaining stored probes. This may for example by achieved by providing second vacuum channels 20 with progressively decreasing cross-seduction, e.g. as shown. It will be appreciated that in embodiments comprising a plurality of pockets the characteristic release time of the first pocket, i.e. the pocket maintaining the position of the cassette, is such that each of the probes of plurality of probes may be (released from the cassette and) transferred to the scanner probe mount before releasing the mounting position of the cassette.

Alternatively or in addition, with reference to the probe release routine describe herein above, it is foreseen to mitigate effects of a possible leak flow by placing a used or worn probe in the empty pocket to cover the probe pocket.

In some embodiments, the mounting surface comprises kinematic mounting means or other similar high-precision mounting means for mounting the cassette with high accuracy and/or reproducibility on the sample stage of the scanning probe microscope. It will be appreciated that the kinematic mounting means or other similar high-precision mounting means preferably matches a mounting means provided on the sample stage of the scanning probe microscope.

In some preferred embodiments, the probe cassette 1 may also have a protective cover to allow safe transport of stored probes. The protective cover preferably holds the probes into the probe pockets and protects the stored probes from contamination, e.g. dust. To this end the protective cover may be provided with a protrusion which presses down on a top surface of the probe when the cover is in a closed position. This allows maintaining a mounting position of a stored probe, particularly in the absence of an external vacuum. The protrusions and/or cover are made from or coated with a material that does not adhere to the probes to allow removing the cover without dislodging the probes from their mounting position.

In other or further embodiments, the probe cassette 1 may be provided with a calibration or testing means to test or calibrate a property of a mounted probe. For example, a top surface of the probe cassette 1 may be provided with a periodic grating of pre-determined shapes to calibrate a condition of a probe tip on the end of a cantilever of a mounted probe. In this way a quality of a probe, e.g. a sharpness or contamination level of a used or freshly transferred probe may be assessed without providing a separate calibration or testing means. Due to provision of the first vacuum chamber C1 maintaining a mounting position of the probe cassette on the stage 102 120 the probe cassette 1 may be particularly suitable for such including means to assess a quality of the probe.

Due to provision of the first vacuum chamber C1 maintaining a mounting position of the probe cassette on the stage 102 the probe cassette 1 may further be particularly suitable for assessing a quality of a stored probe. Advantageously, a resonance frequency of a cantilever probe may be determined before transferring said probe to the mount. For example, stable mounting of the probe cassette 1 and probe in storage allows aligning a probe bearing a cantilever with an optical detection system of the scanning probe microscope 100 which in use (i.e. during a microscopy experiment) optical detection system measures a response of a cantilever by measuring a reflection of a focused laser spot off the cantilever. Advantageously, the stable mounting position of the probe and alignment of the probe with the optical detection system allowed recording a thermal vibration spectrum of the cantilever, e.g. due to Brownian motion, to determine a resonance frequency of he cantilever.

Figure 6B:
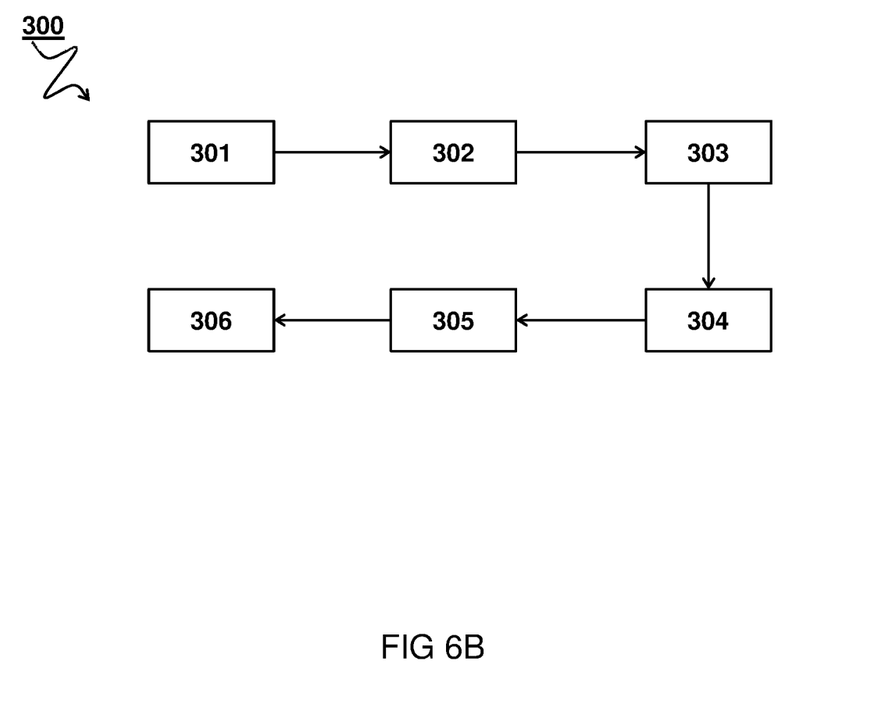
FIG. 6B schematically illustrates a sequence of steps of an embodiment of the method for automated transfer of a probe in a probe cassette to a probe mount of a scanning probe microscope including a selectively activatable pick-up means.

According to a second aspect of the present disclosure there is provided a system 200 of the probe cassette according to any of the preceding claims and a scanning probe microscope 100 including a selectively activatable pick-up means 101 arranged to provide automated transfer of the probe in the probe cassette when mounted on a sample stage 102 of the scanning probe microscope to a probe mount 103 of the scanning probe microscope. In a preferred embodiment, the scanning probe microscope is arranged as an atomic force microscope According to a further aspect of the present disclosure and with reference to FIG. 6B there is provided a method 300 for automated transfer of a probe in a probe cassette to a probe mount of a scanning probe microscope including a selectively activatable pick-up means, the method comprising the steps of:
  providing a probe cassette bearing a probe to the sample stage of a scanning probe microscope 301, the probe cassette being a probe cassette in accordance with any one or more of claims 1-5;
  applying an external vacuum to the outlet of the probe cassette such that a mounting position of the probe relative to the cassette and a mounting position of the cassette relative to the sample stage is maintained 302;
  providing relative movement between sample stage and probe mount to align the probe relative to the probe mount 303;
  activating the selectively activatable pick-up means 304;
  releasing a vacuum to the outlet after aligning a position of the probe relative to the probe mount to reduce a vacuum level maintaining the mounting position of the probe relative to the cassette to allow transfer of the probe from the pocket to the probe mount 305; and
  re-applying the vacuum to the outlet before the vacuum level maintaining a mounting position of the cassette relative to the sample stage is reduced to a level at which the cassette may lose its mounting position 306. In other words, re-applying the vacuum before the force holding the cassette to the sample stage due to said vacuum level may be insufficient to maintain a mounting position, e.g. during an acceleration of the sample stage. In the method the vacuum is preferably re-applied at least before the vacuum level holding the cassette to the sample stage is fully dissipated, i.e. when the pressure difference between ambient an the pressure in first vacuum chamber is about zero.

As described above the pick up means may comprise one or more of: a vacuum clamp; a spring clamp; a magnetic clamp; and an electrostatic clamp. It will be appreciated that the steps need not necessarily be executed in the describe order. Also envisioned are method where in order of steps differs and/or methods including separate steps between prescribed steps. For example, activating the selectively activatable pick-up means may be performed before or simultaneously with releasing a vacuum to the outlet.

Aligning the probe relative to the probe mount may include a step wherein the scan head approaches the sored probe, e.g. chip. To this end coarse positioning means provided to the SPM, e.g. to the sample stage and/or scan head may be used. This includes lateral displacement, e.g. XY translation, and optimizing a separation distance, e.g. Z displacement, between probe cassette 1 and probe mount 103. An optical image may be recorded to confirm and/or adjust coarse alignment. To this end the cassette and/or probe may be provided with fiducial markers. Following coarse alignment an fine positioning step alignment step the probe will be further aligned with the scan head using the sample stage or scanhead actuators (e.g. piezo actuators).

For the purpose of clarity and a concise description, features are described herein as part of the same or separate embodiments, however, it will be appreciated that the scope of the invention may include embodiments having combinations of all or some of the features described. For example, while embodiments were shown for microscopes comprising a vacuum clamp, also alternative ways may be envisaged by those skilled in the art having the benefit of the present disclosure for achieving a similar function and result. The various elements of the embodiments as discussed and shown offer certain advantages, such as stable probe and cassette positioning and ability to reliably transfer a probe from a passive cassette. Of course, it is to be appreciated that any one of the above embodiments or processes may be combined with one or more other embodiments or processes to provide even further improvements in finding and matching designs and advantages. It is appreciated that this disclosure offers particular advantages to automated atomic probe microscopy, and in general can be applied for any application benefitting from automated probe transfer.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A probe cassette for holding a probe in storage for use in a scanning probe microscope, the scanning probe microscope including a selectively activatable pick-up arranged to provide automated transfer of the probe in the probe cassette when mounted on a sample stage of the scanning probe microscope to a probe mount of the scanning probe microscope, the probe cassette comprising:
   a mounting surface arranged to define a first vacuum chamber with a volume V1 for holding the probe cassette onto the sample stage, and
   at least a first probe pocket comprising a pocket surface arranged to define a second vacuum chamber with a volume V2 for holding the probe in storage; and
   a first vacuum channel with a flow resistance R1 and a second vacuum channel with a flow resistance R2, respectively, fluidly connecting the first vacuum chamber and the second vacuum chamber to an outlet fluidly connectable to an external vacuum, such that upon application of the external vacuum, a mounting position of the probe relative to the cassette and a mounting position of the cassette relative to the sample stage is maintained;
   wherein the probe cassette is arranged to allow breaking a vacuum condition in the second vacuum chamber maintaining the mounting position of the probe before breaking of a vacuum condition in the first vacuum chamber maintaining a mounting position of the probe cassette.

2. The probe cassette according to claim 1, wherein the first vacuum channel, the second vacuum channel, the first vacuum chamber and the second vacuum chamber are dimensioned such that a characteristic vacuum release time constant of the first vacuum chamber is larger than both a characteristic vacuum release time constant of the second vacuum chamber and a characteristic transfer time (T3) of the selectively activatable pick up, such that upon a reduction of the external vacuum the probe can be transferred to the probe mount before releasing the mounting position of the cassette.

3. The probe cassette according to claim 1,
   wherein the outlet is:
      included on the mounting surface, and
      separated at a distance from the first vacuum chamber, and
   wherein the outlet is arranged to interface with a vacuum channel provided on the sample stage.

4. The probe cassette according to claim 1, wherein the cassette comprises a plurality of pockets.

5. The probe cassette according to claim 1, wherein the mounting surface comprises a kinematic mounting for mounting the cassette with high accuracy and/or reproducibility on the sample stage of the scanning probe microscope.

6. A system comprising:
   a probe cassette for holding a probe in storage, the probe cassette comprising:
      a mounting surface arranged to define a first vacuum chamber with a volume V1 for holding the probe cassette onto the sample stage, and
      at least a first probe pocket comprising a pocket surface arranged to define a second vacuum chamber with a volume V2 for holding the probe in storage; and
      a first vacuum channel with a flow resistance R1 and a second vacuum channel with a flow resistance R2, respectively, fluidly connecting the first vacuum chamber and the second vacuum chamber to an outlet fluidly connectable to an external vacuum, such that upon application of the external vacuum, a mounting position of the probe relative to the cassette and a mounting position of the cassette relative to the sample stage is maintained;

wherein the probe cassette is arranged to allow breaking a vacuum condition in the second vacuum chamber maintaining the mounting position of the probe before breaking of a vacuum condition in the first vacuum chamber maintaining a mounting position of the probe cassette; and a scanning probe microscope including a selectively activatable pick-up arranged to provide automated transfer of the probe in the probe cassette when mounted on a sample stage of the scanning probe microscope to a probe mount of the scanning probe microscope.

7. The system of claim 6, wherein the first vacuum channel, the second vacuum channel, the first vacuum chamber and the second vacuum chamber are dimensioned such that a characteristic vacuum release time constant of the first vacuum chamber is larger than both a characteristic vacuum release time constant of the second vacuum chamber and a characteristic transfer time (T3) of the selectively activatable pick up, such that upon a reduction of the external vacuum the probe can be transferred to the probe mount before releasing the mounting position of the cassette.

8. The system of claim 6,
wherein the outlet is:
included on the mounting surface, and
separated at a distance from the first vacuum chamber, and
wherein the outlet is arranged to interface with a vacuum channel provided on the sample stage.

9. The system of claim 6, wherein the cassette comprises a plurality of pockets.

10. The system of claim 6, wherein the mounting surface comprises a kinematic mounting for mounting the cassette with high accuracy and/or reproducibility on the sample stage of the scanning probe microscope.

11. A method for automated transfer of a probe in a probe cassette to a probe mount of a scanning probe microscope including a selectively activatable pick-up, the method comprising:

providing a probe cassette bearing a probe to the sample stage of a scanning probe microscope, the probe cassette being a probe cassette for holding a probe in storage for use in a scanning probe microscope, the scanning probe microscope including a selectively activatable pick-up arranged to provide automated transfer of the probe in the probe cassette when mounted on a sample stage of the scanning probe microscope to a probe mount of the scanning probe microscope, the probe cassette comprising:

a mounting surface arranged to define a first vacuum chamber with a volume V1 for holding the probe cassette onto the sample stage, and at least a first probe pocket comprising a pocket surface arranged to define a second vacuum chamber with a volume V2 for holding the probe in storage; and a first vacuum channel with a flow resistance R1 and a second vacuum channel with a flow resistance R2, respectively, fluidly connecting the first vacuum chamber and the second vacuum chamber to an outlet fluidly connectable to an external vacuum, such that upon application of the external vacuum, a mounting position of the probe relative to the cassette and a mounting position of the cassette relative to the sample stage is maintained;

wherein the probe cassette is arranged to allow breaking a vacuum condition in the second vacuum chamber maintaining the mounting position of the probe before breaking of a vacuum condition in the first vacuum chamber maintaining a mounting position of the probe cassette;

applying an external vacuum to the outlet of the probe cassette such that a mounting position of the probe relative to the cassette and a mounting position of the cassette relative to the sample stage is maintained;

providing relative movement between sample stage and probe mount to align the probe relative to the probe mount;

activating the selectively activatable pick-up;

releasing a vacuum to the outlet after aligning a position of the probe relative to the probe mount to reduce a vacuum level maintaining the mounting position of the probe relative to the cassette to allow transfer of the probe from the pocket to the probe mount; and re-applying the vacuum to the outlet before the vacuum level maintaining a mounting position of the cassette relative to the sample stage is reduced to a level at which the mounting position of the probe relative to the cassette and a mounting position of the cassette relative to the sample stage is no longer maintained.

12. The method of claim 11, wherein the first vacuum channel, the second vacuum channel, the first vacuum chamber and the second vacuum chamber are dimensioned such that a characteristic vacuum release time constant of the first vacuum chamber is larger than both a characteristic vacuum release time constant of the second vacuum chamber and a characteristic transfer time (T3) of the selectively activatable pick up, such that upon a reduction of the external vacuum the probe can be transferred to the probe mount before releasing the mounting position of the cassette.

13. The method of claim 11,
wherein the outlet is:
included on the mounting surface, and
separated at a distance from the first vacuum chamber, and
wherein the outlet is arranged to interface with a vacuum channel provided on the sample stage.

14. The method of claim 11, wherein the cassette comprises a plurality of pockets.

15. The method of claim 11, wherein the mounting surface comprises a kinematic mounting for mounting the cassette with high accuracy and/or reproducibility on the sample stage of the scanning probe microscope.

* * * * *